United States Patent [19]

Huber

[11] Patent Number: 5,464,692

[45] Date of Patent: Nov. 7, 1995

[54] FLEXIBLE MASKING TAPE

[75] Inventor: Mortimer J. Huber, St. Paul, Minn.

[73] Assignee: Quality Manufacturing Incorporated, St. Paul, Minn.

[21] Appl. No.: 78,578

[22] Filed: Jun. 17, 1993

[51] Int. Cl.⁶ .......................................................... C09J 7/02
[52] U.S. Cl. ...................... 428/343; 427/208.4; 428/350; 428/352
[58] Field of Search ..................... 428/343, 350, 428/352; 427/208.4

[56] References Cited

U.S. PATENT DOCUMENTS

| | | |
|---|---|---|
| 2,680,724 | 1/1952 | Oppenheim . |
| 3,579,926 | 5/1971 | Gaspari . |
| 3,810,783 | 5/1974 | Bomball . |
| 3,922,464 | 11/1975 | Silver et al. . |
| 4,024,312 | 5/1977 | Korpman ................................ 428/343 |
| 4,126,144 | 11/1978 | Duarte . |
| 4,374,883 | 2/1983 | Winslow . |
| 4,781,957 | 11/1988 | Brown ..................................... 428/343 |
| 4,792,464 | 12/1988 | Martenson . |
| 4,855,170 | 8/1989 | Darvell et al. . |
| 4,917,926 | 4/1990 | Weinhold et al. . |
| 5,010,131 | 4/1991 | Wagner . |
| 5,049,445 | 9/1991 | Arvidsson et al. . |
| 5,096,761 | 3/1992 | Roberts ................................... 428/343 |
| 5,116,676 | 6/1992 | Winslow . |
| 5,178,913 | 1/1993 | Kusonoki et al. . |
| 5,198,301 | 3/1993 | Hagar ..................................... 428/343 |

OTHER PUBLICATIONS

Grip–Mask Strippable Coating Product Data Sheet, pp. 57–58.

"Product Review", *Sign Builder Illustrated*, pp. 32–33 (Sep.–Oct. 1992).

*Primary Examiner*—Jenna L. Davis
*Attorney, Agent, or Firm*—Merchant, Gould, Smith, Edell, Welter & Schmidt

[57] ABSTRACT

A removable masking tape suitable for protecting a surface on a substrate that has irregular curvatures and contours, the masking tape containing a polymeric tape that is flexible and deformable to conforming to the contour, or curvature of the surface. After the masking tape has been applied to the surface of the substrate, the masking tape is capable of maintaining the contour and the curvature in the position it is applied over time without departure.

17 Claims, No Drawings

FLEXIBLE MASKING TAPE

FIELD OF THE INVENTION

This invention relates generally to highly flexible, stretchable and contracting masking tape useful in masking a surface of an object to be treated with a surface treatment such as spray painting.

BACKGROUND OF THE INVENTION

Peelable, protective films and tapes have a number of uses in industry. These uses include protecting finished surfaces from damage during manufacture, shipping, and handling as well as masking certain areas of a surface from exposure during spraying operations including painting. The coatings are generally cohesive films which have moderate adhesion to the substrate and which can be easily removed from the surface simply by lifting one portion from the surface and peeling the film away.

In masking applications, the films are generally relatively clear to allow the mask preparer to discern patterns projected onto and through the film. In addition, the films are relatively easily cut with sharp knives. This is to allow the mask maker to apply the film to a surface, project a pattern through a transparent or translucent substrate, and to cut through the film mask to selectively expose areas of the substrate to permit the painting of exposed areas of the substrate.

Masks are commonly used for protecting selected areas of a substrate to be treated with a surface treatment, such as spray painting, sandblasting, etc. Such masks are used for covering a part of the surface to be treated so that the covered surface may be part of the surface of the final product, or the covered surface may be later treated with a different surface treatment process. For example, a surface of an automobile may be painted with two different colors. Part of the surface to be painted with one color may first be masked while the rest of the surface is painted with the other color. Afterwards, the first area may then be unmasked and painted while the second area is masked.

Many varieties of masking tapes are commercially available. Some of these masking tapes contain tapes that are made of paper, while others contain tapes that are made of polymeric materials. Examples of commercially available masking tapes are, SCOTCH 233™ (3M Company, St. Paul, Minn.), ARMAC TG6™, American Tape™.

Masking tapes have been used for a long time. Efforts have been made to find improvements. Usually improvements can be made on the adhesive element or the tape element.

Early aqueous films are represented by Oppenheim, U.S. Pat. No. 2,680,724, which discloses particular temporary protective coatings based upon a plasticized polyvinyl butyryl resin. However, the aqueous composition requires processing at elevated temperatures, well in excess of 100° C. This material has apparently been marketed for a number of years under the trademark SPRAYLAT. However, once the material has been used and stripped from a surface, the material does not appear to be recoverable, and the processor must dispose of a great deal of waste. It is well known that current manufacturing conditions are demanding a reduction in such process waste, and therefore, a recoverable masking or protective film must be found.

Another peelable or strippable film is disclosed in Martenson, U.S. Pat. No, 4,792,464. This film is a temporary, readily strippable, protective film for metal surfaces which incorporates corrosion inhibitors and is impervious to gases such as oxygen and water vapor. The film is applied as an aqueous composition comprising (1) a terpolymer of polyvinyl butyryl, polyvinyl alcohol, and polyvinyl acetate; (2) a hydroxyalkyl cellulose ester; (3) a corrosion inhibitor dispersed in a plasticizer for the polyvinyl butyryl; and (4) morpholine as a leveling agent. This composition is apparently designed simply as temporary, protective coating for metals, and the reference apparently does not contemplate use of the film as a painting mask. In any event, the reference fails to recognize the waste problem of requiring the recovery and reuse of the film.

A third type of removable, protective film composition is disclosed in Wagner, U.S. Pat. No. 5,010,131. This film is disclosed for use in paint spray booths to protect the booth and equipment therein from paint overspray. The film-forming aqueous solution comprises a film-former, a filler, an alkaline source, and a blowing agent. Film-formers disclosed include vinyl acetate copolymer emulsions, sugar, soap, certain organic salts, and polyvinyl alcohol. The film is sprayed on a surface and allowed to dry. After the film has become contaminated with paint overspray, it is removed by action of a pressurized spray of hot water (at least 190° F.). The action of the hot water activates the blowing agent which helps to release the film from substrates. Thus, the film does not appear to be peelable. Further, the removal process results in the presence of potentially hazardous particulate waste material in process water. This creates significant waste removal problems for the practitioner. In addition, there is no disclosure of recovery or reuse of the protective film material.

Winslow, U.S. Pat. No. 4,374,883 describes a normally tacky and pressure sensitive adhesive tape that is resistant to aging. The adhesive of the pressure sensitive adhesive tape contains a sheet backing bearing a composite adhesive stratum having a layer of polyurethane and a layer of soft, normally tacky pressure sensitive adhesive bonded to the polyurethane layer. The pressure sensitive tape is described as having superior adhesive properties. Polymeric films and paper are used as backing for the adhesive.

Another example of efforts to find better adhesives for a pressure sensitive adhesive tape suitable for a masking tape is Darvell et al., U.S. Pat. No. 4,855,170. Darvell et al. discuss a pressure sensitive tape having a pressure sensitive adhesive containing and completely surrounding resilient non-tacky hollow thermoplastic polymeric microspheres. The presence of the polymeric microsphere in the adhesive is described as responsible for enhancing desirable mechanical properties such as compression recovery, high peel strength, improved static sheer and high tensile strength. Examples of tape materials for coating with the adhesive are cellulose acetate and polyester. There is no emphasis on the properties of the tape materials.

Sometimes, special materials are incorporated into the tape part of the masking tape to impart special properties. Wenhold et al., U.S. Pat. No. 4,917,926 describe a pressure sensitive adhesive tape for masking selective areas of an article containing a polymeric film coated with a layer of adhesive, wherein both the film and the adhesive are resistant to high temperatures and soluble in a fluorocarbon solvent. This masking tape is particularly applicable in soldering operations involving printed circuit boards. Wenhold et al. also point out that water soluble tapes based on polyvinyl alcohol are also possible. Such solvent possible tapes are adapted for ready removal when the surface treatment has been accomplished.

Since masking tapes are sometimes applied on surfaces that are not completely flat, it is necessary for a masking tape to be able to conform to the contour on the object on which the tape is to be applied. Kusunoki et al., U.S. Pat. No. 5,178,913 describes a printing mask containing an aluminum foil and a film of a resin provided on one surface of the foil and having a high power of adhesion to both the foil and any paint applied onto the film. The aluminum foil is described as being so flexible that it adapts itself to the shape of the surface to be masked. The aluminum foil is described as being able to retain the deformed shape once applied to the surface that it eliminates or minimizes the necessity of using additional means for holding the mask in position. The resins that can be employed for making the mask include polyvinyl chloride, polyester and polyamide resins. Even though this masking tape is described as flexible and conformable to irregularities of a surface to be painted, it appears that the flexibility is in the direction perpendicular to the planer surface only.

Although many patents disclose masking tapes, none has been identified to describe a highly flexible, highly plasticized masking tape that is stretchable, compressible, and flexible not only in the direction perpendicular to the planer surface of the tape but also in the direction parallel to the planar surface of the tape. When a masking tape is applied to a surface in a planar, curved configuration, one edge of the tape is stretched and the other edge of the tape is compressed. If the tape is not sufficiently compressible and stretchable, the compressed edge tends to form folds and the stretched edge might have the tendency to return to its original shape by creeping on or lifting from the surface of the masked object to decrease the acuteness of the curvature. There is a need for a masking tape that is highly flexible, compressible and stretchable in a direction that is parallel to the planar surface of the tape.

SUMMARY OF THE INVENTION

The present invention is directed to a removable masking tape suitable for protecting a surface of a substrate having irregular contours in a surface treatment, a method of making, and a method of using such a removable masking tape. As used herein, the term "contour" refers to the general form and shape of an object, whether one, two, or three dimensional. The masking tape of the present invention contains a polymeric tape that is flexible and deformable for conforming to a contour of a surface having substantial planar curvature without departing from the contour over time after the masking tape has been applied to the surface of a substrate. "Departing from the contour" means creeping on the surface of the masked object or lifting from the same due to forces internal to the masking tape, trying to restore the masking tape to a shape with less curvature. The masking tape has an adhesive property such that the masking tape can be applied and adhered to a surface. Depending on the composition of the masking tape, in some cases, a pressure sensitive adhesive can be applied to the polymeric tape to render the masking tape capable of adhering to a surface. In other cases, the polymeric tape itself may be composed of a composition that has an adhesive property.

The masking tape is highly flexible and deformable. The term "deformable" refers to the characteristics of being compressible and stretchable. A masking tape of the present invention is capable of being deformed (i.e. compressed or stretched) in either planar direction from its normal condition and maintaining such a deformed shape after being applied to the surface of a substrate for a period of time adequate for accomplishing the surface treatment. Preferably the deformability is at least 10%, and more preferably 20%.

The deformability and flexibility of the masking tape are dependent on the thickness and width of the tape. When the masking tape is made with a polymeric tape about 100 to about 150 microns (4 to 6 mils) thick, about 1.27 cm wide, and applied to a surface of a substrate, the masking tape is capable of conforming to a planar contour such that the outer edge has a curvature of at least about 10° per cm of circumference, and preferably about 12° per cm without either the inner edge forming one or more folds or the outer edge creeping or lifting from the surface of the substrate.

In a case where the masking tape is applied to a surface such that the inner edge of the masking tape is conforming to a planar contour, the inner edge of the masking-tape, which if made with a polymeric tape about 100 microns to about 150 microns (4 to 6 mils) thick and about 0.32 cm wide, can maintain a curvature of at least about 50° per cm, preferably about 60° per cm without either the inner edge forming one or more folds or the outer edge creeping or lifting from the surface of the substrate.

Generally, the masking tape can contain a polymeric tape of any highly plasticized, flexible and deformable material that possesses the required compressibility, stretchability, and flexibility. Examples of suitable polymeric materials are natural rubber, synthetic rubbers such as silicone, butyl rubber, and other elastic polymers. Preferably, the polymeric tape is made from an aqueous coating composition that includes about 70 to 80 wt. % of an aqueous vehicle, about 20 to 30 wt. % of a polyvinyl acetate resin, about 0.1 to 5 wt. % of a plasticizer, 0.1 to 5 wt. % of a water soluble polysaccharide gum, less than about 1 wt. % of a water emulsifiable thickening agent to increase the viscosity of the composition and to impart cohesiveness to the composition, about 0.01 to 1 wt. % of a release agent to render the dried film peelable from a substrate and about 0.1 to 1 wt. % of a defoaming agent. A mask made with this preferred composition, once used, can be recycled by dissolving in water and the resulting aqueous composition can be further processed for making new films.

A composition can be applied to a substrate as a protective film or mask. The film can remain on the surface to protect the substrate during further manufacture, shipping and/or other handling, or it can be cut and selectively removed to act as a mask for paint spraying operations. The composition can be used to make tapes and films for masks.

Masking tapes can be made in a variety of ways. One method of making the polymeric tape of a masking tape of the present invention is applying a composition containing a suitable polymeric material on a substrate, allowing the composition to solidify and making the solidified film into strips of polymeric tape. The composition containing the suitable polymeric material can be applied on the substrate by a spraying process, a screen printing process or the like. Another method of making the polymeric film is by an extrusion process. Alternatively, other methods of making films and tapes can be employed.

Protective tapes or masks which are pressure sensitive can be prepared. Tapes may have longitudinal reinforcing fibers and may be provided in roll form with or without release liners. Such tapes can be produced in width ranging from about ⅛ inch to greater than one inch. Stencils may be provided—cut from a preformed film or screen printed onto a release liner.

After use, the preferred water soluble masking film or tape can be removed from the substrate, and recovered to reformulate the aqueous coating composition. The invention additionally relates to a process of recovering the above-described preferred peelable masking tape by combining the used tape with water at a temperature of less than about 100° C. and at a pH of about 4 to 7. In this manner, an aqueous, film-forming composition is reformulated.

Even though a wide variety of polymeric materials may be used for making the polymeric tape and a wide variety of pressure sensitive adhesives may be used for rendering the polymeric tape capable of adhering to a surface, it is preferred that the polymeric tape and the pressure sensitive adhesive be water soluble to facilitate the removal and recycling of the masking tape after the masking function of the masking tape has been accomplished.

To further improve the ability of the masking tape to conform to a highly irregular contour without departing from the contour over time, a deformable metallic wire may be incorporated into the masking tape. For example, a copper wire can assist the masking tape in maintaining the curvature of the masking tape after it has been applied to a surface.

A masking tape of the present invention can be used for protecting a portion of a surface of a substrate. Such a masking tape is particularly suitable for protecting a portion of a surface of a vehicle part during painting and subsequent baking processes. A method of utilizing such a masking tape for protecting a surface contains the steps of providing a masking tape that is flexible and deformable for conforming to a contour of a surface having substantial planar curvature without departing from the contour over time after the masking tape has been applied to the surface of the substrate, aligning the masking tape with the contour of a surface to be protected, and applying the masking tape to the surface to protected.

In the preferred embodiment of protecting a portion of a surface of a vehicle part during painting and subsequent baking processes, the process involves aligning the flexible and deformable masking tape with the contour of the surface to be protected, attaching the masking tape to the surface, applying paint to the portion of the surface of the vehicle parts to be painted, baking the painted vehicle part with the masking tape still in place, at a selected temperature for an appropriate period of time to cure the paint, and removing the masking tape from the painted, baked vehicle part.

Because the masking tape of the present invention is highly flexible and deformable, it is advantageously useable in protecting surfaces with highly irregular contours and curvatures. Furthermore, because the masking tape is compressible, it also finds application where voids and crevasses need to be protected from surface treatment processes. In such an instance, the highly compressible masking tape may be compressed and fitted into the crevasses and voids. Such a masking tape can find application in processes such as painting and sandblasting.

DETAILED DESCRIPTION OF THE INVENTION

The claimed invention is directed to a flexible masking tape containing a highly plasticized, flexible, compressible, stretchable tape and adhesive. This masking tape is particularly suitable for use in the painting of automobiles. The tape is made of a polymeric material that is highly flexible and deformable. The masking tape is capable of adhering well to the surface of the object to be masked and conforming to the many irregularities on the surface of the object. The edges of the tape is capable of bonding well to the surface such that paint will not seep in through the edges, forming undesirable irregular lines. The masking tape is also compressible such it can be put into crevices. When there are sharp bends, for example, as in locations around the doors and windows, the stretchability of the masking tape would prevent the masking tape from departing from the contour of the surface of the object due to the memory of the tape. When a masking tape is applied to a planar surface in a curved manner, the outer edge of the curved masking tape is stretched while the inner edge of the masking tape is compressed. The compressibility of the masking tape would prevent folding of the tape on the inner edge. Folding of the tape would result in a ragged edge being painted and irregular thickness in the resulting coat of paint. The extreme compressibility, flexibility, and stretchability of the masking tape of the present invention will prevent this undesirable effect.

Tape and Material

Any highly flexible, deformable, plasticized polymeric material tan be used for making the masking tape of the present invention. It is preferable that the polymeric masking tape is stretchable and compressible to at least about 10%, more preferably 20% of its normal dimension in either direction in the plane of the masking tape. Such a masking tape would appear to be "limp" when held in the hand as it is also extremely flexible.

When the masking tape, which has an outer edge and an inner edge, is made to have a polymeric tape of thickness about 100 to about 150 microns (4 to 6 mils) with a width of 1.27 cm and applied to a surface of a substrate, the masking tape is capable of conforming to a planar contour such that the outer edge has a curvature of at least about 10° per cm of circumference, and preferably about 12° per cm without either the inner edge forming one or more folds or the outer edge creeping or lifting from the surface of the substrate.

In a case where the masking tape is applied to a surface such that the inner edge of the masking tape is conforming to a planar contour, the inner edge of the masking tape, which if made to have a polymeric tape thickness of about 100 microns to about 150 microns (4 to 6 mils) with a width of 0.32 cm, can maintain a curvature of at least about 50° per cm, preferably about 60° per cm without either the inner edge forming one or more folds or the outer edge creeping or lifting from the surface of the substrate. Depending on the particular application, the thickness of the masking tape can be varied to obtain deformability outside the above ranges.

Many commonly available, highly elastic, deformable and flexible polymeric materials are suitable. These polymeric materials may also contain plasticizers to make them more flexible and deformable. Examples of suitable elastic polymers include both natural and synthetic rubbers. Examples of synthetic rubbers are polybutadiene, polyisoprene, stryene-butadiene rubber, neoprene, nitrile rubber, butyryl rubber, polyacrylate rubber, silicone rubber, polyurethanes, ethylene-propylene terpolymers, chlorosulfonated polyethylene and epichlorhydrin rubber. The making of elastic polymeric materials and the incorporation of plasticizers to improve the flexibility, elasticity, compressibility and stretchability of the polymeric material are well known in the art. A discussion on rubber and related materials can be found in Kirk-Othmer, *Encyclopedia of Chemical Technology*, 2 Ed., Vol. 17, pages 509–684. A discussion on synthetic elastomers can also be found in Kirk-Othmer,

*Encyclopedia of Chemical Technology*, 2 Ed., Vol. 7, pages 676–716.

Particularly preferable for forming the masking tape is a film disclosed in patent application Ser. No. 07/969,998 filed on Nov. 2, 1992 which is incorporated by reference herein. This film is formed from a composition containing water, a polyvinyl acetate resin, thickening components including a water soluble polySaccharide gum and a water emulsifiable thickening agent. The polyvinyl acetate resin can be combined with other components such as tackifiers and plasticizers as an aqueous emulsion. Preferably, a minor amount of polyvinyl alcohol is also incorporated into the composition as well as synthetic resin tackifiers and plasticizers. The plasticizer is selected to allow a dried film to maintain a minor level of moisture. In this preferred embodiment, the plasticizers include, for example, glycerine, triacetin, polyols such as propylene glycol, ethylene glycol, glycol derivatives, sorbitol, etc. Generally, an amount of a suitable plasticizer effective for producing the desirable deformable and flexible property in the masking tape is used. Typically, the amount of plasticizers incorporated into the film forming aqueous composition is about 0.1 to 5 wt. %, more preferably about 0.5 to 1.5 wt. %, and most preferably about 1 wt. %.

The thickening agent in the preferred embodiment relating to the aqueous composition is useful for increasing the cohesion of the aqueous composition, acting as a suspending agent and improving the stability and film forming capabilities of the composition. Examples of water emulsifiable thickening agents include carboxyl alkyl, starches and polysaccharide materials such as xanthan gum.

The emulsion of the aqueous composition preferably includes about 50 wt. % solids, more preferably about 48 to 55 wt. %, and most preferably about 52 wt. %.

A polymeric film as described in the preferred embodiment has the advantage of being water soluble. When the painting operation is finished, the masking tape can be peeled and removed from the surface to be painted and the masking tape may be recycled. In a recycle operation, a painted masking tape, after being stripped from the substrate, may be combined with hot water (at a temperature of less than 100° C.), and at a lightly acidic pH (about 4 to about 7). With agitation, as the polyvinyl acetate polymer dissolves, the paint can be separated. The remaining solution that contains the polyvinyl acetate, thickening agent, etc., may be properly treated and made into an aqueous composition suitable for forming a highly flexible water soluble masking tape again.

The desirable mechanical properties, such as flexibility and deformability can be effectively controlled by adjusting the ratio of plasticizers in the polymeric material. For example, in the preferred embodiment of the aqueous composition containing polyvinyl acetate, the ratio between plasticizers such as xanthan gum, glycerine and polyvinyl acetate can be adjusted to obtain the desired mechanical characteristics.

To further improve the masking tapes capability of conforming to the contour of the object on which the masking tape is applied, a metallic element such as a copper wire can be incorporated into the masking tape. For example, such a copper wire can be embedded in the middle of the masking tape along the longitudinal axis of the tape. As the masking tape is deformed to conform to the contour of the object to be painted, the metallic element tends to prevent the deformed masking from returning to the predeformed shape.

The highly flexible and deformable masking tape can be made by any means commonly available. Polymeric films can be cast as a whole sheet or extruded as a continuous long strip. The casting of a polymeric film may involve a solvent. When a liquid composition containing a polymeric material is cast on a surface, the evaporation of the solvent would leave a film of the polymeric material on a substrate.

The aqueous composition described above may be applied to a substrate and allowed to dry. The composition may be sprayed, roll coated onto a substrate. Other methods known in the art of applying a composition similar to the described embodiment on a surface of a substrate may also be used. After drying, the polymeric film may be cut into sheets or strips of suitable size, depending on the application. The masking tape can then be formed into rolls of tape. The width of the tape is typically about 0.25 inch to over an inch. Depending on the application, the width of the masking tape can be outside this range.

PREFERRED EMBODIMENT OF POLYMERIC TAPE

The polymeric tape can be made of an aqueous film-forming composition comprising water, a polyvinyl acetate resin, optional thickening components including a water-soluble polysaccharide gum and a water emulsifiable thickening agent, and a release agent. In addition, the composition may include stabilizers, pigments, fillers, and defoaming agents.

Aqueous Vehicle

The aqueous vehicle provides for the flowability of the composition and allows the film to be formed on a substrate. The vehicle may be essentially all water or it may include a portion of a miscible organic co-solvent. Such co-solvents may include lower alcohols such as methanol, ethanol, n-propanol, n-butanol, etc. Preferably the co-solvent (if any) is methanol or ethanol. The use of a co-solvent results in a quicker drying formulation.

The co-solvent may be present at a level up to about 40% of the total composition in order to keep the flash point of the composition above room temperature. More preferably, the co-solvent is present at less than about five percent. In one embodiment, there is minimal (1–2%) organic co-solvent. This reduces particularly preferred bubbles in the films produced and provides a less hazardous work environment.

Polyvinyl Acetate Resin

The polyvinyl acetate resin provides the majority of the film-forming properties of the aqueous composition.

The polyvinyl acetate resin is preferably combined with other components such as tackifiers and plasticizers as an aqueous emulsion. More preferably, the polyvinyl acetate emulsion is formulated as an adhesive emulsion comprising minor amounts of polyvinyl alcohol, as well as synthetic resin tackifiers and plasticizers. This emulsion preferably includes about 50 wt. % solids, more preferably about 48 to 55 wt. %, and most preferably about 52 wt. %. The emulsion may also include various other components. such as surfactants and stabilizers to increase the storage life of the emulsion. In addition, the polyvinyl acetate emulsion may include an effective amount of freeze-thaw stabilizers to stabilize the emulsion through numerous freeze-thaw cycles which may otherwise destroy the emulsion. For example, XR-5832M, a polyvinyl acetate emulsion adhesive available from H. B. Fuller Company is useful in the preparation of the aqueous film-forming composition of the invention.

Plasticizer

The plasticizer of the aqueous film-forming mixture is selected to render the resulting film pliable and to allow a dried film to "wet" a glassy substrate for adhesion. In addition, the plasticizer may act as a humectant to ensure that the dried film maintains a minor level of moisture. The plasticizers may be any water soluble or water dispersible composition which is compatible with polyvinyl acetate and imparts flexibility to the dried film either through true plasticization or as a humectant. Representative examples of useful plasticizers and humectants include glycerine, propylene glycol, ethylene glycol, glycol derivatives, sorbitol, sucrose, triacetin, etc. Preferred plasticizers are the humectants such as glycerine, propylene and ethylene glycol, and sorbitol. More preferred is glycerine. The plasticizers is preferably incorporated into the aqueous mixture at about 0.1 to 5 wt. %, more preferably about 0.5 to 1.5 wt. %, and most preferably about 1 wt. %.

Thickening Agent

The thickening agents employed in the aqueous film-forming composition may be useful to increase the cohesion of the liquid composition during the drying process, as a suspending agent or protective colloid to improve the stability of the aqueous emulsion, and to improve the film-forming capabilities of the composition. A representative, non-limiting list of useful water emulsifiable thickening agents includes carboxyl alkyl polymers such as carboxyvinyl polymers or carboxyl polymethylene; and starches such as potato starch. Additionally thickeners including water soluble polysaccharide materials such as xanthan gum are also useful in the composition of the present invention. To obtain multiple benefits, a combination of (1) a carboxyl vinyl polymer or potato starch and (2) xanthan gum is used as a thickening agent.

Release Agent

The release agent or adherent of the aqueous film-forming composition is selected to render the film formed from the aqueous composition peelable from a substrate. Preferably, the release agent works to render the film peelable from a substrate such as metal, glass, or plastic or another polymeric structure or coating. A representative, non-limiting list of such release agents or adherents includes lecithin, solid or liquid polyoxyethylene glycols or polyethylene glycols, lower molecular weight metal soaps such as potassium or sodium salts of fatty acids, and ethylene oxide-propylene oxide nonionic surfactants such as PLURONICS™ available from BASF. Preferably, the release agent is a liquid polyethylene glycol or lecithin, and most preferably, the release agent is lecithin.

Optional Components

The aqueous film-forming composition optionally includes stabilizers, pigments, fillers, and defoaming agents. The stabilizers may include both stabilizers for the emulsion (e.g. surfactants) as well as stabilizers to render the aqueous composition freeze-thaw stable (e.g. alcohols).

In addition, pigments, dyes, and fillers may be incorporated into those compositions which do not require light-transparent properties. These pigments and dyes may provide identifying characteristics to the aqueous composition, the peelable, protective film, or both. The fillers may increase some of the films properties such as toughness, strength, etc.

The defoaming agents may be helpful in the processing of the aqueous composition to reduce foam created during the mixing of the components to form the composition. In addition, the defoaming agents are helpful to reduce bubbles and resulting pinholes in a protective film or mask formed by spraying or brushing the aqueous composition on a substrate. A representative, non-limiting list of useful defoaming agents includes higher alcohols, sulfonated oils, organic phosphates, silicone fluids, and siloxanes such as dimethylpolysiloxane. Preferably, the defoaming agent is a silicone fluid or dimethylpolysiloxane.

Adhesives

A wide variety of adhesives are applicable for masking tape applications. These adhesives are generally pressure sensitive adhesives. The term "pressure-sensitive adhesive" refers to an adhesive that in solvent-free form are aggressively tacky at room temperature and would adhere to a surface on contact. Normally only very slight pressure is adequate for applying a pressure sensitive adhesive to a surface to obtain good adhesion. A suitable pressure sensitive adhesive may be based on natural or synthetic rubber. One requirement of a pressure sensitive adhesive for use as a masking tape which is applicable for painting automobiles is that after the painting operation is finished, the masking tape can be removed without the damaging the coating of paint. An undesirable property of a pressure sensitive is build up, which is an adhesion increase over time. Build up might result in a difficulty in removing the masking tape after the masking tape has stayed on a surface for a period of time. For example, if a masking tape is applied to a painted surface, and the build up is strong enough, it may not be possible to remove the masking tape without damaging the coating of paint underneath the masking tape. Another type of pressure sensitive adhesive that is applicable for a masking tape adhesive are the "acrylate" adhesives, examples of which are the isoctyl acrylate/acrylic acid copolymer and isoctyl acrylate/acrylamide copolymer. Other examples of pressure sensitive adhesives are copolymers of vinyl monomers such as a non-tertiary alkyl acrylate and zwitterionic monomer.

For the present invention, the preferred adhesive is one that is water soluble so that after the painting operation, the masking tape can be removed and recycled. Examples of such water soluble adhesives include gums such as gum arabic with glycerine (in the boiled or non-boiled form), polysaccharides such as starch-based adhesives, protein-based adhesives and the like. Appropriate water-soluble adhesives are commercially available. An example of a suitable water soluble adhesive is XR1377/224 available from H.B. Fuller Co., St. Paul, Minn.

In the preferred embodiment wherein a film forming aqueous composition containing polyvinyl acetate resin is used for forming the masking tape, an adhesive may be applied to the masking tape or the masking tape itself may be applied directly onto a substrate without an additional layer of adhesive being disposed between the masking tape and the substrate. In the case in which the masking tape made from the aqueous composition containing polyvinyl acetate is used without an additional layer of adhesive, a mist of water may be applied to the surface of the masking tape to tackify the masking tape material before applying to the substrate surface.

Using the Flexible Masking Tape

The flexible masking tape can be made with any thickness suitable for the particular application. Generally, the thinner the tape, the more flexible and deformable it is. However, thinner tapes do not have the mechanical integrity as thicker tapes do, and may be easily punctured, ripped or otherwise damaged. Therefore, the need for flexibility and deformability is balanced with the need for physical integrity. Typically, for applications such as painting automobile parts, the polymeric tape has a thickness of about 50 to about 250 microns (2 to 10 mils), preferably about 100 to about 150 microns (4 to 6 mils), although depending on the particular application, other thicknesses may be desirable.

The flexible masking tape can be made into strips of suitable width and length for appropriate applications. Generally, factors that influence the choice of the width of the masking tape, other than being dictated by the physical dimensions of the object to be masked, include convenience of handling, and expense. Typically, a tape that is less than 0.25 inch wide is not easily worked by hand, and a tape that is much wider than 2 inches may be wasteful because other less expensive masking means such as paper may be used to mask large areas.

When a large surface area is to be masked, a masking sheet of less expensive material may be used while employing the masking tape of the present invention to mask the edge of the area. This can be accomplished by providing an adhesive to secure the masking sheet to the side of the masking tape that is not attached to the object being masked. This adhesive can either be an integral part of the masking tape, or be applied after the masking tape has been attached to the object.

The masking tape can be made into a roll for convenient handling. In use, the masking tape is unwound and applied to a surface, stuffed into a groove, etc. in a desired manner. The masking tape may be stretched, bent, twisted, and otherwise deformed to conform to the contour and shape of the object.

The flexible, deformable masking material can also be made into sheets rather than tape form. Patterns can be cut on the flexible masking sheets or tapes to form masks. For example, computer aided design/computer aided manufacturing (CAD/CAM) equipment can be programmed to cut precise pattern in such masking sheets or tapes. This type of application is particularly useful in manufacturing of products where many identical masks are needed. This type of masks is useful in painting, sandblasting applications, etc.

Process of Recycle

After a water-soluble peelable mask of the above-described preferred embodiment has been used to protect a surface, the material may be stripped from the substrate surface and combined with water to reformulate an aqueous film-forming composition. The product may be recycled if it has been painted or if it has been simply used as a surface protective coating. If the masking tape has been painted, the paint must be separated from the film-forming resin prior to or concurrently with reformulating the aqueous film-forming composition.

In recycling a painted tape, the painted tape may be combined with water at a temperature of less than about 100° C. and at a pH of about 4 to 7. The aqueous composition may be agitated for a period of time necessary to effectively dissolve the tape. The paint which has been on the masking tape generally remains as paint chips and/or flecks in the aqueous solution of the film-forming material. The paint may then be separated from the aqueous film-forming composition by filtration, settling, or other means well known in the separator art. If the resulting aqueous composition has a viscosity which is below that normally used in the application of the composition to form the masking tape, additional film-forming components can be added to the aqueous composition in the proportions required for the original film-forming composition procedure. This can be done until the resulting composition has a pudding-like consistency.

In recycling an unpainted tape, the tape may be combined with water at a temperature of less than about 100° C. and at a pH of about 4 to 7. The aqueous composition may be agitated for a period of time necessary to effectively dissolve the tape. The tape to be recycled and the water are generally combined in a ratio of about 2 to 2.5:1. Some additional thinning may be required in low humidity conditions. This results in a composition essentially the same as originally formulated having a solids content of about 18 to 24 wt. %.

The aqueous mixture can also be prepared from clean tape or packaged sheets. In this manner, the tape can be recycled or the material can be prepared in sheet form and shipped to a customer. Shipping the product in a dry form tremendously decreases shipping costs. To reconstitute the sheets, 30 parts by weight of the tape or sheets can be placed in a container with 70 parts by weight of an aqueous vehicle comprising water or a water and alcohol mixture. The sheets are allowed to rest in the aqueous vehicle until the liquid becomes gummy. Then the mixture is agitated until attaining a uniform consistency. This reconstitution procedure results in a mixture having about 30 wt. % solids.

The aqueous mixture can be formed into pressure sensitive adhesive masking film tapes or stencils. The masking tapes consist essentially of a single layer which adheres to glassy surfaces. The single layer comprises about 70 to 99 wt. % of a polyvinyl acetate resin, about 0.1 to 15 wt. % of a water soluble polysaccharide gum, about 0.1 to 15 wt. % of an emulsifiable thickening agent and about 0.01 to 5 wt. % of a release agent to render a tape formed from an aqueous composition peelable form a substrate. The resulting tape is capable of deforming, stretching and being formed into smooth curves having compound radii in a single plane as well as smooth curves on surfaces having compound curves. This can be done without wrinkling along either edge of the film tape. This is a substantial improvement over masking tapes currently available in the market place such as FINE-LINE, SCOTCH brand 218 MQA tape available from 3M. While this tape is strong and adhesive, it is generally too inelastic to form smooth curves along both edges of the tape when formed into a planar curve.

The present masking tape can be formed into rolls of tape varying in width from about one-eighth inch to over an inch. Greater widths tend to be more difficult to form into smooth planar curves while lesser widths tend to be too weak, susceptible to breakage and difficult to handle. The adhesive strength of the tape can also vary. Increasing the relative proportion of plasticizer increases the initial tack of the tape, while increasing the release agent or thickener tends to decrease the initial tack of the tape. In addition, the tape can be sprayed with a light mist of water to increase the tack prior to applying to a surface to be protected.

The film tape can be prepared by coating a film onto a conveyor belt having a smooth, glassy surface, heating the film to quickly dry it, slitting the resulting film into tape strips and rolling the strips onto a core. In addition, the tape can be rolled up with a release liner to prevent blocking (the tendency of the film to stick to itself) during storage.

The masking film can also be formed as a patterned stencil. The stencil can either be cut, washed or otherwise prepared from a preformed film on a backing sheet, or it can be formed from the aqueous, film-forming mixture itself. In forming a stencil from a preformed film, the pattern can be die cut, manually cut with a knife, or otherwise prepared. In forming a stencil from the aqueous mixture, it can be painted on a backing sheet, screen printed or otherwise patterned prior to drying the mixture to form a film. The backing sheet should be release lined, e.g. waxed paper, silicone-sprayed kraft paper, MYLAR film, etc. Again, the pressure sensitive adhesive properties such as tack can be modified by formulation as described above, or the stencil can be activated by a fine water mist prior to application.

EXAMPLES

To illustrate and promote an understanding of the present invention, the following examples are provided.

Example 1

The following components were used to prepare a protective film according to the present invention:

| Component | Grams |
| --- | --- |
| Polyvinyl acetate emulsion (H.B. Fuller XR5832M) | 472 |
| Water | 500 |
| COLLOID 685 defoamer (Rhone-Poulenc) | 6 |
| COLLOID 912 defoamer (Rhone-Poulenc) | 0.8 |
| Xanthan gum | 6 |
| CARBOPOL 675 (Union Carbide) | 1.2 |
| Glycerine | 8 |
| Lecithin | 0.2 |
| JET DRY surfactant | 5 |

One-third of the water (tap water at about 55° F.) was charged into a mixing vessel. Agitation was commenced with mixing blades and a centrifugal recirculation pump and continued as a mixture of the glycerine, lecithin and JET DRY was added. A mixture of the defoamers, xanthan gum and CARBOPOL was added to the mixer under agitation. The remaining water was added at a temperature of about 100° F. to the mixer, and agitation continued until the mixture was smooth, and the polyvinyl acetate emulsion having about 55 wt. % solids and a viscosity of about 10,000 cP was added. Agitation continued until the mixture was smooth.

The resulting mixture had a pudding-like consistency and had a solids content of about 25 wt. %. A relatively thin film of the mixture was sprayed onto a substrate to form a masking film. A dried film had sufficient pressure sensitive qualities to adhere the film to a glassy substrate to provide protection during subsequent spray painting.

Example 2

The following components were used to prepare a quick dry protective film according to the present invention:

| Component | Grams |
| --- | --- |
| Polyvinyl acetate emulsion (Fuller XR-5832M) | 650 |
| Water | 320 |
| COLLOID 685 defoamer (Rhone-Poulenc) | 6 |
| COLLOID 912 defoamer (Rhone-Poulenc) | 0.8 |
| Xanthan gum | 4 |
| CARBOPOL 675 (Union Carbide) | 0.8 |
| Glycerine | 8 |
| Lecithin | 0.3 |
| JET DRY surfactant | 5 |

The procedure of Example 1 was repeated in preparing the aqueous mixture. The resulting mixture had a pudding-like consistency and had a solids content of about 35 wt. %. A relatively thin film of the mixture was sprayed onto a substrate to form a masking film. A dried film had sufficient pressure sensitive qualities to adhere the film to a glassy substrate to provide protection during subsequent spray-painting operations.

Example 3

The following components were used to prepare a protective film according to the present invention:

| Component | Grams |
| --- | --- |
| Polyvinyl acetate emulsion (Fuller XR-5832M) | 444 |
| Water | 526 |
| COLLOID 685 defoamer (Rhone-Poulenc) | 6 |
| COLLOID 912 defoamer (Rhone-Poulenc) | 0.8 |
| Xanthan gum | 8 |
| CARBOPOL 675 (Union Carbide) | 1.2 |
| Glycerine | 4.4 |
| Lecithin | 0.2 |
| JET DRY surfactant (Ecolab, Inc.) | 5 |
| Methanol | 10 |

The procedure of Example 1 was repeated in preparing the aqueous mixture, and the methanol was added after the polyvinyl emulsion had been added and the mixture was smooth. The resulting mixture had a pudding-like consistency and had a solids content of about 35 wt. %. A relatively thin film of the mixture was sprayed onto a substrate to form a masking film. A dried film did not had sufficient pressure sensitive qualities to adhere the film to a glassy substrate to provide protection during spraying operations.

Example 4

A masking film is made using the method of Example 1 and cut into strips 2.5 cm wide. The strips are rolled into rolls of tape. The tape has a thickness of about 100 microns (4 mils). In the painting of an automobile door, the masking tape is applied on the borders of areas to be masked on the automobile door according to a desired design. Masking paper sheets are cut to cover the large areas and applied on the masking tape. The adhesive characteristic of the masking tape secures the masking paper sheets in place. The automobile door is then spray-painted. The automobile door is then baked at an elevated temperature to cure the paint. The masking tape and the masking paper is then carefully removed by peeling off the masking tape.

Example 5

A masking film is made using the method of Example 1 and cut into strips 2.5 cm wide. The strips are rolled into rolls of tape. The tape has a thickness of about 100 microns (4 mils). In the painting of a roof of an automobile with chrome trims of about 1.5 cm wide, pieces of masking tape are applied on and cover the chrome trims. The edges of the pieces of masking tape are then pushed into crevices between the chrome trims and the roof. A solvent-based paint is then sprayed on the roof. After the evaporation of the solvent and the curing of the paint, the pieces of masking tape are then carefully removed by peeling away the masking tape from the roof.

The used masking tape is cut into pieces of about 20 cm long and immersed in water of about 80° C. at a pH of about 5 in a weight ratio of about one part of masking tape to 2.5 parts of water. The resultant mixture is then stirred with an agitator until the masking tape is dissolved. The paint particles are separated from the aqueous solution by centrifugation and filtration. Additional film-forming components are added to result in a film-forming composition suitable for forming new films.

Example 6

A masking film is made using the method of Example 2 and cut into strips 2.5 cm wide. The strips are rolled into rolls of tape. The tape has a thickness of about 100 microns (4 mils). In the painting of the outside wall of house, the masking tape is applied on the borders of wooden window frames. Sheets of masking paper are cut and applied to the masking tape to cover larger areas. The edges of the masking tape is then pushed into the crevices between the window frames and the wall. A paint is then applied on the wall. After the curing of the paint, the masking tape is then carefully removed by peeling away the masking tape from the window frames.

Although the present invention has been described with reference to the above particular discussion and examples, it should be understood that those skilled in the art may make many other modifications without departing from the spirit and scope of the invention as defined by the appended claims.

I claim:

1. A method of making a removable masking tape suitable for protecting a surface of a substrate having irregular contours, comprising (a) providing a polymeric tape that is flexible, stretchable, compressible and deformable for conforming to a contour of the surface having substantial planar curvature without departing from the contour when said masking tape is applied to the surface of the substrate; and (b) rendering the polymeric tape capable of adhering to the surface of the substrate, wherein the polymeric tape contains a polyvinyl acetate resin and is water soluble.

2. The method of claim 1 wherein the masking tape has an outer edge and an inner edge, said outer edge, when the masking tape is made to have a width of about 1.27 cm and applied to a surface of a substrate, capable of conforming to a planar contour having a curvature of at least about 10° per cm without either the inner edge forming one or more folds or the outer edge creeping or lifting from the surface of the substrate.

3. The method of claim 1 wherein the masking tape has an outer edge and an inner edge, said outer edge, when the masking tape is made to have a width of about 1.27 cm and applied to a surface of a substrate, capable of conforming to a planar contour having a curvature of about 10° to about 12° per cm without either the inner edge forming one or more folds or the outer edge creeping or lifting from the surface of the substrate.

4. The method of claim 1 wherein the masking tape has an outer edge and an inner edge, said inner edge, when the masking tape is made to have a width of about 0.32 cm and applied to a surface of a substrate, capable of conforming to a planar contour having a curvature of at least about 50° per cm without either the inner edge forming one or more folds or the outer edge creeping or lifting from the surface of the substrate.

5. The method of claim 1 wherein the masking tape has an outer edge and an inner edge, said inner edge, when the masking tape is made to have a width of about 0.32 cm and applied to a surface of a substrate, capable of conforming to a planar contour having a curvature of about 50° to about 60° per cm without either the inner edge forming one or more folds or the outer edge creeping or lifting from the surface of the substrate.

6. The method of claim 1 wherein the masking tape is capable of conforming to the contour of the surface without departing from such a contour when the masking tape is deformed at least about 10% in either planar direction from its normal condition and applied to the surface of the substrate.

7. The method of claim 1 wherein the masking tape is capable of conforming to the contour of the surface without departing from such a contour when the masking tape is deformed about 10 to about 20% in either planar direction from its normal condition and applied to the surface of the substrate.

8. The method of claim 1 wherein the polymeric tape is rendered capable of adhering to a surface by coating at least a portion of one surface of the polymeric tape with a pressure sensitive adhesive.

9. The method of claim 8 wherein the adhesive is water soluble.

10. The method of claim 1 wherein the polymeric tape is capable of adhering to the surface of the substrate.

11. The method of claim 1 wherein one surface of the polymeric tape has a release agent disposed thereon such that the masking tape will not adhere to itself.

12. The method of claim 1 wherein the polymeric tape has a metallic wire disposed therein.

13. A removable masking tape suitable for protecting a surface on a substrate having irregular contours, the masking tape comprising a polymeric tape that is flexible, stretchable, compressible and deformable for conforming to the contour of the surface having substantial planar curvature without departing from the contour when said masking tape is applied to the surface of the substrate, wherein the polymeric tape contains a polyvinyl acetate resin and is water soluble.

14. The masking tape of claim 13 wherein the masking tape is capable of conforming to the contour of the surface without departing from such a contour when the masking tape is deformed at least 10% in either planar direction from its normal condition and applied to the surface of the substrate.

15. The masking tape of claim 13 wherein the masking tape is capable of conforming to the contour of the surface without departing from such a contour when the masking tape is deformed about 10% to about 20% in either planar direction from its normal condition and applied to the surface of the substrate.

16. The masking tape of claim 13 further comprising a pressure sensitive adhesive disposed on at least part of a surface of the polymeric tape.

17. The masking tape of claim 16 wherein the adhesive is soluble in water.

* * * * *